United States Patent
Rex

[15] 3,687,558
[45] Aug. 29, 1972

[54] LASER POWER-ENERGY METER

[72] Inventor: George A. Rex, San Antonio, Tex.

[73] Assignee: The United States of America as represented by the Secretary of the Air Force

[22] Filed: July 16, 1971

[21] Appl. No.: 163,204

[52] U.S. Cl. .................356/218, 356/224, 356/226, 356/227
[51] Int. Cl. .............................G01j 1/42, G01j 1/44
[58] Field of Search......356/213, 215, 218, 224, 225, 356/226, 227; 324/96

[56] References Cited

UNITED STATES PATENTS

| | | |
|---|---|---|
| 3,302,521 | 2/1967 | Grantham et al..........356/213 |
| 3,523,739 | 8/1970 | Weisglass..................356/215 |

*Primary Examiner*—Ronald L. Wibert
*Assistant Examiner*—V. P. McGraw
*Attorney*—Harry A. Herbert, Jr. et al.

[57] ABSTRACT

A laser power-energy meter includes a photo-diode which acts as a current generator whose output is directly proportional to the optical power incident upon it. The meter provides a direct measurement of optical energy on a per pulse basis on single or repetitive laser pulses by measuring each pulse individually and storing and displaying the energy of the largest received. It also provides a measurement of the power of CW lasers. The measurements are in terms of amount of energy which would enter the human eye. The meter is battery operated and portable.

6 Claims, 4 Drawing Figures

INVENTOR.
GEORGE A. REX
BY Harry A. Herbert, Jr.
George Fine
ATTORNEYS

LASER POWER-ENERGY METER

BACKGROUND OF THE INVENTION

This invention relates to laser safety monitoring devices and more particularly to a laser power-energy meter measuring the power of CW lasers and maximum per pulse energy of pulsed lasers.

The nature of the light emitted by lasers, i.e., their coherence and limited beam divergence is such that exposure of the eye to very small energies can result in damage to the retina. At present, safe exposure distances from operational lasers are determined by calculations based on the operational parameters of the laser and atmospheric conditions. At present, there are no available detectors which can be used to verify these calculations. Most available detectors are designed for energy measurements on the order of 100–200 times the damage threshold of the human eye and have no provision for measuring repetitive pulses except by averaging the pulses received.

The laser power-energy meter of the present invention can be used to check radiation from ground and airborne systems to insure safety of personnel in the irradiated areas. It will also provide personnel who are responsible for safety a means of verifying accuracy of calculations.

The laser power-energy meter of the present invention has a particular utility as a laser safety monitoring device. It measures the power of CW lasers, and the maximum per pulse energy of pulsed lasers with pulse widths of 10 nanoseconds to 1 millisecond, and with repetition rates from zero to 160 per second. A maximum of 10 laser wavelength-mode combinations may be available to the operator. The meter is battery operated and it is designed for use in field operations as well as in the laboratory.

SUMMARY OF THE INVENTION

The laser power-energy meter of the present invention provides a direct measurement of optical energy on a per pulse basis on single or repetitive laser pulses. It does not average the energy for a group of pulses, but measures each pulse individually and stores and displays the energy of the largest received. It also measures the power of CW lasers. The measurements are in terms of the amount of energy which would enter the human eye.

The laser power-energy meter includes a photo-diode which acts as a current generator whose output is directly proportional to the optical power incident upon it. Optical band pass filters and neutral density filters may be mounted between the photo diode and the laser light source and one may be selected in accordance with the wavelength. An arrangement also is provided to secure the proper load for the wavelength of interest. Still further, means are provided to obtain the proper gain for each selected wavelength to compensate for the spectral response of the photo diode and the characteristics of the filters. It is noted that the filters, the arrangement for securing the proper load, and the means to obtain proper gain are connected so that they are operated in unison in accordance with the wavelength of the light being measured.

A capacitor is utilized for loading the photo-diode during pulse measurements and a resistor for CW power measurements. The photo-diode is shorted momentarily to ground at a preselected rate to discharge the capacitor to ground or to short the resistor. In the case of shorting the capacitor, this ensures that the voltage thereupon is due to only one laser pulse. Means are also provided to ensure that the pulse measured is the highest value received during the measurement. The output is displayed on a voltmeter calibrated in optical energy and power. In the operation of the meter in the CW mode, the voltage across the resistor load is a function of the current through it and is therefore proportional to the optical power.

DETAILED DESCRIPTION OF THE PREFERRED EMBODIMENT

Figure 1:
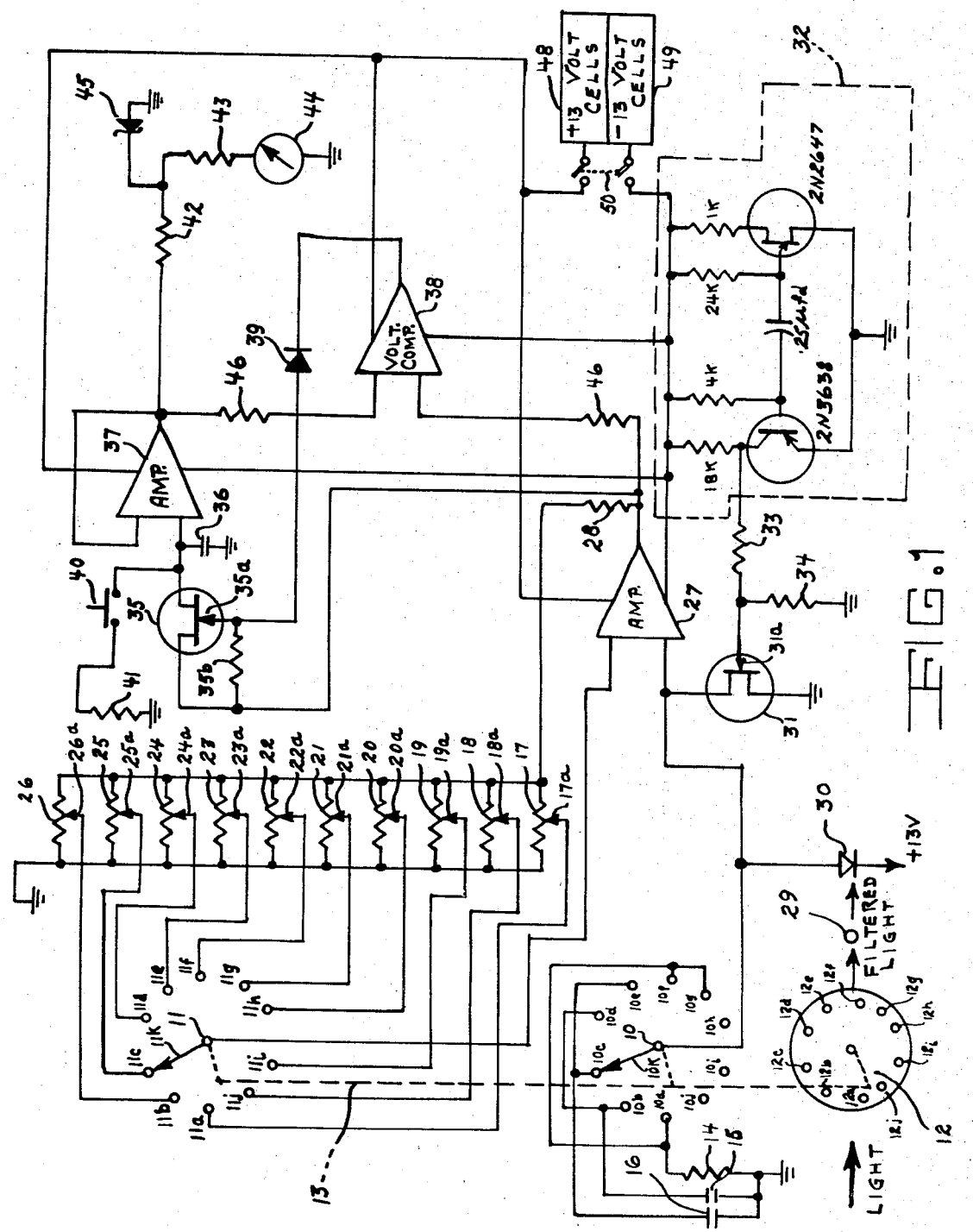
FIG. 1 is a circuit diagram of the preferred embodiment of the laser power-energy meter of the present invention.

Now referring in detail to FIG. 1, there is shown two ganged, 10-pole rotary switches 10 and 11 having stationary contacts 10a–10j and 11a–11j also having rotary contacts 10k and 11k, respectively. Turret 12 containing optical band pass filter and neutral density filters 12a–12j are positioned therein and is mounted on common shift 13 of two-ganged ten pole rotary switches 10 and 11. When turret 12 is rotated rotary switches 10 and 11 are simultaneously controlled thereby. Stationary contact 10a is connected to ground by way of resistor 14 which in this instance was a 1 percent precision resistor with a value of 1 K. Stationary contacts 10b and 10c are connected to ground by capacitors 16 and 15, respectively. They are 1 percent capacitors with a value of 1 $\mu$. Stationary contact 10d is connected to 10b, 10e to 10c, 10g to 10f to 10a, and 10h, 10i, and 10j are unconnected. There is also shown parallel connected potentiometers 17 through 26 having rotors 17a–26a, respectively, one end of the parallel potentiometers connected to ground, the other end to the output of noninverting operational amplifier 27 by way of resistor 28. Rotors 17a–26a are connected to stationary contacts 11a–11j, respectively. Rotor 11k of potentiometer 11 is connected to the input of operational amplifier 27.

Now referring again to turret 12, light from a source such as a laser passes through one of the selected filters 12a–12, the selection being in accordance with the wavelength of the light being measured. The filtered light is then passed through aperture 29 which is especially designed to have a 7 mm diameter which is the average diameter of the human pupil at night. Aperture 29 may be formed in a stationary material positioned in the region of photo-diode 30 so that the filtered light passing therethrough is the direct input signal to photo-diode 30.

Photo-diode 30 has an active area of one square cm. Turret 12 containing the aforementioned optical band pass filters and neutral density filters is mounted between photo-diode 30 and a light source. Turret 27 is mounted on shift 13 of two ganged, ten-pole rotary switches 10 and 11. Rotary switch 10 selects the proper load for the wavelength of interest. For pulsed lasers, a 1 percent capacitor such as capacitor 15 is selected. Reverse-biased photo-diode 30 acts as a current generator whose output is directly proportional to the optical power incident upon it, and is linear within 2 % for approximately seven orders of magnitude over its inherent noise current. The parameter of interest in this case is the optical energy in each laser pulse. Power is expressed in watts and 1 watt=1joule/sec. The response of photo-diode 30 is expressed in amps/watt. 1 amp = 1 coulomb/sec, combining the two expressions:

$$1\ amp/watt = \frac{\frac{coul}{sec}}{\frac{Joules}{sec}} = \frac{coul}{joule}$$

and the charge on the capacitor is directly proportional to the energy in the optical pulse, regardless of the duration of the pulse. The voltage on a capacitor is directly proportional to the charge on the capacitor, i.e., $V = coul/farad$ and in the case aforementioned the voltage is therefore proportional to the optical energy. Field effect transistor (FET) 31 is connected across the diode load to ground. Gate 31a of transistor 31 is connected to the output of astable multivibrator 32 by way of resistor network 33 and 34. Astable multivibrator 32 has a negative thirteen volt output pulse with a duration of 6 milliseconds and a pulse separation of 0.5 milliseconds. This causes FET 31 to switch from the conducting to the nonconducting state every 6 miliseconds and discharge the capacitor to ground. This assures that the voltage on the integrating capacitor is due to only one laser pulse, if the repetition rate of the laser being measured is 160 cps or less. It is noted that astable multivibrator 32 is conventional and includes elements having their magnitudes indicated. Multivibrator 32 might also be shown in block form rather than schematic.

The voltage on the load capacitor of photo-diode 30 is amplified by operational amplifier 27 in a noninverting configuration. The gain of amplifier 27 is controlled by a feedback network comprised of 10 K potentiometers 17–26 connected in parallel from the output of amplifier 27 to ground. Rotary switch 11 selects one of the arms of these potentiometers and connects it to the inverting input of amplifier 27. Each potentiometer is adjusted to provide the proper gain for each wavelength selected to compensate for the spectral response of photo-diode 30 and the characteristics of the filters. The output of amplifier 27 is fed to a sample and hold circuit which is comprised of input series FET switch 35, holding capacitor 36, and amplifier 37. FET switch 35 includes gate 35a and resistor 35b. The output of amplifier 27 besides being fed to the aforesaid input of the sample and hold circuit is also fed to the noninverting input of voltage comparator 38 by way of resistor 46. The input of the sample and hold circuit is, as aforementioned, a series FET switch which is controlled by the output of voltage comparator 38. The output of the sample and hold circuit is fed to the inverting input of voltage comparator 38 by way of resistor 46. If the voltage signal from amplifier 27 is larger than the voltage stored in the hold circuit, the output of voltage comparator 38 is positive. The output of voltage comparator 38 is fed to FET gate 35 through diode 39, so connected that only negative voltages are passed through it. A positive comparator output is therefore blocked and the channel FET conducts and charges holding capacitor 36 to the voltage from the input. The output of the sample and hold circuit is then the highest value received during the measurement. Pushbutton switch 40 and resistor 41 is connected across holding capacitor 36 to provide a reset of the circuit for new measurements.

The output of the hold circuit by way of resistors 42 and 43 is displayed on voltmeter 44. Voltmeter 44 is calibrated in optical energy and power. The output is protected by Zener diode 45.

The operation of the laser power-energy meter in the CW mode is similar except the precision resistor load for the photo-diode is shorted momentarily to ground every 6 milliseconds. The voltage across this resistor is a function of the current through it and is therefore proportional to the optical power detected.

It is again noted that the filters in the turret are mounted behind a 7 mm diameter aperture, the average diameter of the human pupil at night and therefore the energy falling on the diode is that which would enter the eye.

Figure 2:
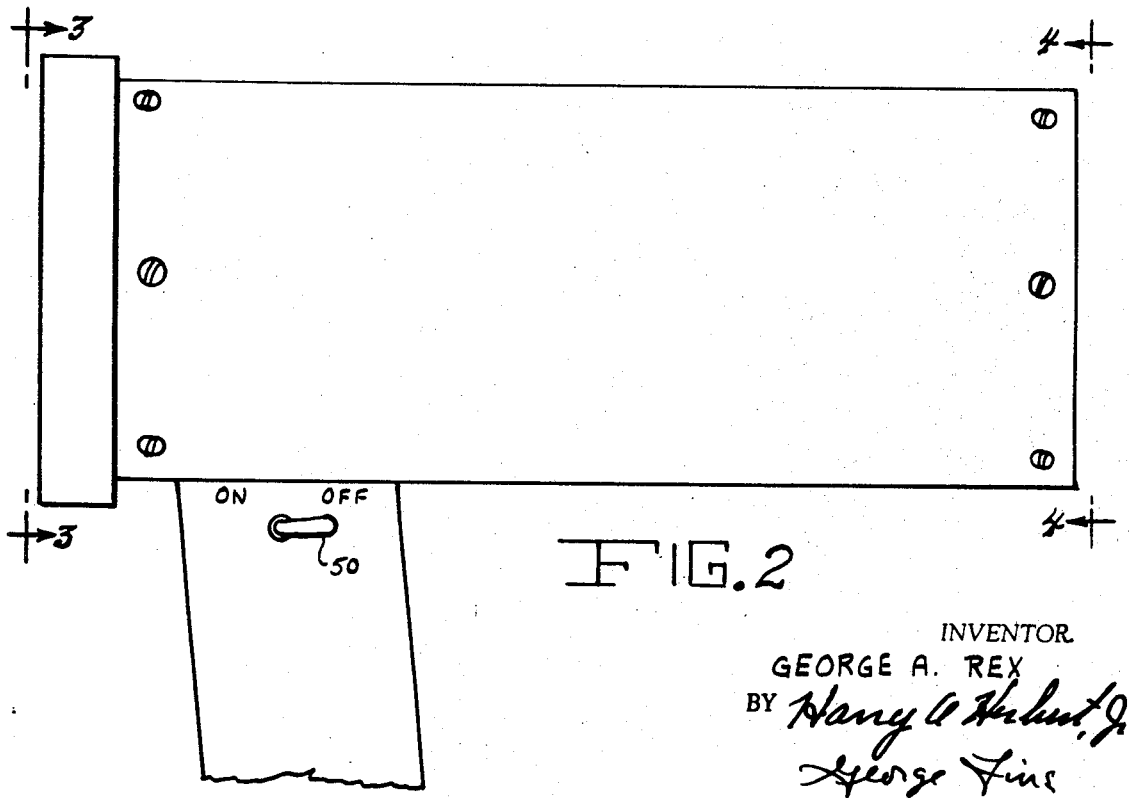
FIG. 2 shows the cylindrical housing with a pistol-grip handle for circuit shown in FIG. 1.

The circuitry shown in FIG. 1 is housed in a cylindrical case with a pistol-grip handle as indicated in FIG. 2. The laser power-energy meter is powered by four 6.75 volt mercury cells contained also in the case. Now referring to FIG. 1, two of the cells 48 are utilized to supply +13 volts and the other two cells 49 for −13 volts. Switch 50 is gauged and may be utilized to permit the appropriate voltages to be applied to amplifier 27, multivibrator 32, amplofier 37, and voltage comparator 38 to provide an off-on operation.

Figure 3:
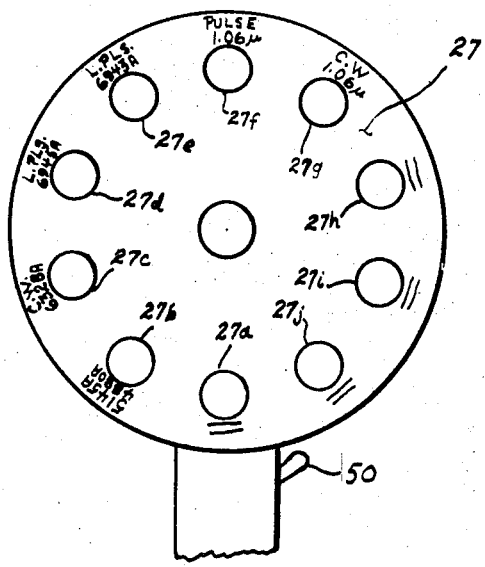
FIG. 3 shows one end of the cylindrical housing along line 3—3 of FIG. 2.

Now referring to FIG. 3, there is shown one end of cylindrical case of FIG. 2 along line 3—3 which is turret 27 of FIG. 1. Turret 27 is rotatable and includes filters 27a–27j as hereinbefore described. Each of the filters are to be utilized for a particular wavelength of interest for either pulse or CW. Each of filters 27a–27j may be labeled for purposes of indentification.

Figure 4:
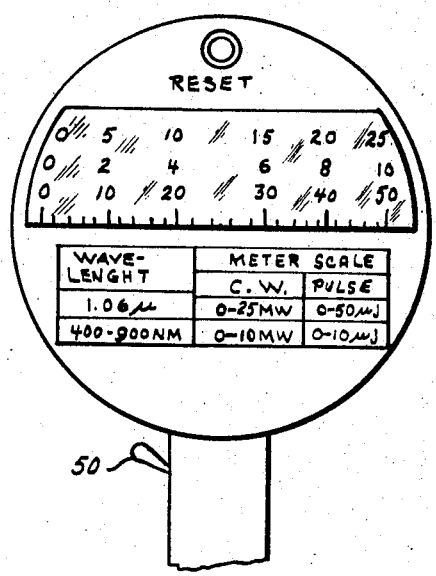
FIG. 4 shows the other end of the cylindrical housing shown along line 4—4 of FIG. 2.

Referring to FIG. 4, there is shown the other end of FIG. 2 along line 4—4. Voltmeter 44 is shown calibrated in three scales and underneath voltmeter 44 is a table related thereto.

What is claimed is:

1. A meter for measuring over a wide wavelength bandwidth and wide pulse length the pulse energy and CW power of light from a source such as a laser to provide safety monitoring comprising photo-diode means acting as a current generator having an output directly proportional to the optical power incident upon it, a multiplicity of filters, each of said filters capable of passing a preselected wavelength in accordance with the wavelength of the light being measured, first means to select one of said multiplicity of filters in accordance with the wavelength of the light being measured, said first selecting means being disposed between said photo-diode means and said light source, aperture means disposed between the selected filter and said photo-diode means permitting the filtered light to be incident upon said photo-diode means, said aperture means having a predetermined diameter in the region of the average diameter of the human pupil, a multiplicity of loads for said photo-diode means, each of said loads being a capacitor or a resistor in accordance with the pulse energy or CW power, respectively, of said light being measured, second means to select one of said loads in accordance with the pulse energy or CW power being measured, means to short the selected load to ground at a predetermined rate and period, means to amplify the output signal from said photo-diode means, said amplifying means having an input and output and including a gain controlling feedback network, said feedback network being comprised of a multiplicity of potentiometers connected in parallel from the output of said amplifying means to ground, third selecting means to select one of the arms of said multiplicity of potentiometer for connection to said input of said first amplifying means to provide the proper gain for each wavelength selected to compensate for the spectral response of said photo-diode means and the characteristics of the selected filters, said first, second, and third selecting means being interconnected and controlled in unison to provide the proper filter, load, and gain, respectively, in accordance with the wavelength of the light being measured, fourth means to select from the output of said amplifying means the highest value of pulse or CW power, and means to measure the energy in the selected pulse or the magnitude of CW power.

2. A meter as described in claim 1 including means for resetting said fourth selecting means upon completion of the measurement.

3. A meter as described in claim 1 wherein said fourth selecting means is comprised of sample and hold means having an input and output, a series switch connected to said input of said sample and hold means, said series switch receiving a first input signal from said amplifying means and a second input signal for controlling the operation thereof, comparator means having inverting and noninverting inputs and an output, said noninverting input receiving the output from said amplifying means, said inverting input receiving the output from said sample and hold means, and a diode connected between said output of said comparator to said series switch to supply said second input thereto, said diode passing only negative voltages.

4. A meter as described in claim 1 wherein said means to measure is comprised of a meter calibrated in pulse energy and in CW power.

5. A meter as described in claim 1 wherein said means to short is comprised of a switch connected across said load, and a stable multivibrator means controlling the opening and closing said switch at a predetermined rate and period.

6. A meter as described in claim 1 including a portable cylindrical case with a pistol-grip handle serving as a housing for said meter.

* * * * *